United States Patent Office 3,781,199
Patented Dec. 25, 1973

3,781,199
CATALYTIC HYDROCRACKING OF AMMONIA CONTAINING FEEDSTOCKS
John W. Ward, Yorba Linda, Calif., assignor to Union Oil Company of California, Los Angeles, Calif.
No Drawing. Filed Mar. 20, 1972, Ser. No. 236,185
Int. Cl. C10g 23/00
U.S. Cl. 208—89
16 Claims

ABSTRACT OF THE DISCLOSURE

Hydrocarbon feedstocks in admixture with ammonia, as for example the total effluent derived from the catalytic hydrofining of a nitrogen containing feedstock, are subjected to hydrocracking in the presence of a stabilized, ammonia-resistant Y zeolite catalyst. Stability to steam and ammonia is imparted to the zeolite base during conversion from its original sodium form to a decationized and/or hydrogen form by a novel sequence of: (1) partial exchange of ammonium ions for sodium ions, (2) steam calcination, (3) further ion exchange of ammonium ions for sodium ions, and (4) recalcining the twice-exchanged zeolite in intimate admixture with a finely divided, hydrous metal oxide such as alumina.

BACKGROUND AND SUMMARY OF INVENTION

In catalytic hydrocracking, the use of catalysts based on various forms of Y zeolite has become widespread. For this purpose, the most desirable forms of Y zeolite are those wherein the original zeolitic sodium ions have been replaced by more desirable cations such as hydrogen ions, or polyvalent metal ions such as magnesium or rare earth metal ions. Still another desirable form is sometimes referred to in the literature as the "decationized" form, which it now appears may actually consist of a form in which part of the exchange sites are actually cation deficient and another portion is satisfied by hydrogen ions. To produce the hydrogen and/or decationized forms, the general procedure is to exchange most or all of the original sodium ions with ammonium ions, and the resulting ammonium zeolite is then heated to decompose the zeolitic ammonium ions, first forming a hydrogen zeolite, which may upon further heating be at least partially converted to the truly decationized form. The hydrogen form, the decationized form, and the mixed hydrogen-decationized forms will be referred to hereinafter collectively as "metal-cation-deficient" Y zeolite.

A problem which was encountered at an early stage in the development of Y zeolite hydrocracking catalysts was that of thermal and hydrothermal stability. The metal-cation-deficient zeolites were found to be in general more active than the polyvalent metal forms, but did not display the desired hydrothermal stability. "Hydrothermal stability" refers to the ability to maintain crystallinity and surface area upon exposure to water vapor. Severe hydrothermal conditions are often encountered in hydrocracking, either as a result of inadvertent process upsets, or during oxidative regeneration of the catalysts, or in other ways. Also, throughout the hydrocracking run cycle, 1–2 p.s.i. of water vapor is nearly always present in the recycle gas. For these and other reasons, most commercial Y zeolite hydrocracking processes now in operation utilize a polyvalent metal-stabilized form of the zeolite, even through some degree of cracking activity is thereby sacrificed.

In U.S. Pat. No. 3,293,192 to Maher et al., a modified metal-cation-deficient form of Y zeolite is described which to a large extent overcomes the stability problems associated with the more conventional metal-cation-deficient forms mentioned above. Termed "ultrastable" zeolite "Z-14US," this material is prepared by (1) partially exchanging the original sodium zeolite with ammonium ions, (2) calcining to form a sodium-hydrogen zeolite, (3) reexchanging with ammonium ions to reduce the sodium content to below one weight-percent, and finally (4) again calcining to produce the ultrastable, metal-cation-deficient zeolite. This ultrastable zeolite has been found to display adequate stability in most area of use, but in at least one particular area of hydrocracking has been found to be deficient, i.e., in hydrocracking operations carried out in the presence of ammonia. It has been found that when ammonai is in contact with the catalyst small amounts of water in conjunctions therewith can bring about a gradual, or sometimes rapid, deactivation of the catalyst, accompanied by a drastic reduction in crystallinity and surface area.

Stability in the presence of ammonia is necessary in one very desirable adaptation of catalytic hydrocracking. Most hydrocracking feedstocks contain substantial amounts of organic nitrogen compounds which drastically reduce the efficiency of all presently known hydrocracking catalysts. It has hence become common practice to subject such feedstocks to a preliminary catalytic hydrofining treatment to convert the organic nitrogen to ammonia (as well as to desulfurize the feed). The more conventional approach has been to hydrofine the feed, cool and condense the liquid product, water washed to remove ammonia, and then hydrocrack the washed liquid product. The equipment and utilities required for this interstage purification add greatly to the overall expense of the operation, separate recycle gas systems being required for the hydrofiner and the hydrocracker. This expense however was considered unavoidable when using conventional hydrocracking catalysts based on amorphous cracking bases, because ammonia poisoned the cracking activity of such catalysts to almost as great an extent as did the original organic nitrogen compounds.

This picture changed significantly however with the advent of Y zeolite-based hydrocracking catalysts. In the case of these catalysts it was found that the poisoning effect of ammonia was much less than that of the organic nitrogen compounds, and could be overcome by merely raising the hydrocracking temperature about 50–150° F. The possibility thus presented itself of operating the hydrofiner and the hydrocracker "integrally," with a common recycle gas ssytem for both reactors, thus eliminating the interstage equipment and utilities required for separation of ammonia from the hydrofined product. This integral system is the subject of U.S. Pat. No. 3,159,568, and has been a substantial economic factor in the development of Y zeolite catalytic hydrocracking. It is in reference to these systems that the ammonia-stable catalysts of this invention are most useful.

Briefly stated, the ammonia-stable catalysts of this invention are a novel modification of the hydrothermally stable zeolites described in the above Maher et al. patent. To prepare these catalysts, the four-step procedure outlined above is modified as follows: In step (2), the first calcination step, certain minimum partial pressures of steam are maintained in contact with the zeolite, and in step (4), the final calcination is carried out after mixing the zeolite with a finely divided, hydrous metal oxide such as alumina. By mixing the zeolite with the metal oxide prior to the final calcination, some unknown interaction appears to occur between the metal oxide and the ammonium moiety of the zeolite. As a result of this unknown interaction, the final product is found to exhibit not only the desired hydrothermal stability, but is also stable in the presence of ammonia and water vapor, thus overcoming the major deficiency of the ultrastable zeolite. For convenience, I refer to my new ammonia-stable, hydrothermally-stable zeolite as "AS–US zeolite." A fortuitous aspect of AS–US zeolite is that it is substantially more active than the ultrastable zeolite.

DETAILED DESCRIPTION

The initial sodium Y zeolite starting material utilized herein ordinarily has an $SiO_2/Al_2O_3$ mole ratio between about 3 and 6, and contains about 10–14 weight-percent of sodium as $Na_2O$. In the initial ammonium ion exchange step, the sodium zeolite is digested in conventional manner with an aqueous solution of a suitable ammonium salt such as the chloride, nitrate, sulfate, carbonate, acetate, etc. to replace at least about 20 percent but not more than about 95 percent, of the original sodium ions with ammonium ions. The sodium content should be reduced to about 0.6–5 percent, preferably about 1–4 percent by weight as $Na_2O$. To reduce the sodium level to this value, it may be desirable to employ two or more stages of exchange treatments. If it is desired to remove less than about 50 percent of the sodium in this step, dilute acids, e.g., 0.01 N $HNO_3$, may be used instead of ammonium salts.

I have found that in order to produce a composition having the desired properties outlined above, it is essential that the zeolite at this stage be calcined in the presence of steam, as opposed to calcination under anhydrous conditions. It is believed that calcining in the presence of water during this first thermal treatment is necessary to preserve a higher degree of crystallinity, while maintaining ion exchange capacity and catalytic activity. The steam treatment also alters the pore size distribution of the zeolite; the initial Y zeolite has uniform pore diameters of about 10–12 A., while in the steamed product a substantial proportion of the pore volume is in pores greater than 20 A. diameter.

The steam calcination is usually conducted in the presence of at least about 0.2 p.s.i. water vapor pressure, and preferably about 5 to 15 p.s.i. This objective can be realized by any procedure capable of maintaining a substantial water vapor partial pressure in contact with the zeolite during at least the initial stages of the treatment. In one modification, the wet zeolite from the exchange step can merely be heated in a covered container so as to retain the water vapor generated therefrom. Alternatively the zeolite can be introduced into a batch or continuous rotary furnace, or a static bed calcination zone, into which preheated humidified air is introduced.

The steaming should be effected at a temperature sufficient to thermally stabilize the zeolite and convert it to the corresponding hydrogen and/or decationized form, yet insufficient to thermally degrade a substantial portion of the crystal structure. Steaming temperatures are normally in excess of 600° F., preferably about 800 to 1650° F. Steaming is continued for a period sufficient to convert the zeolite to the desired stabilized metal-cation-deficient form. The duration of treatment is usually at least about 0.5 minutes, preferably about 30 minutes to about four hours.

If desired, the resultant zeolite can be subjected to further ion exchange and steaming to increase the hydrogen ion content and correspondingly reduce the sodium content. However, I have found that the necessary degree of exchange can be efficiently accomplished by one exchange-steaming cycle.

The resultant steam-calcined zeolite is then reexchanged with ammonium salt solution under sufficiently severe conditions to reduce the sodium content to less than about 2 weight-percent, usually less than one percent, and preferably less than 0.6 weight-percent, as $Na_2O$. It should be realized that this second exchange treatment does not introduce any appreciable amount of ammonium ions into the exchange sites which were converted to hydrogen ion and/or decationized sites in the previous calcination step; nearly all of the ammonium ions which go into the zeolite at this point do so by replacing remaining sodium ions. Since a substantial ammonium zeolite moiety is desired in the final calcination step for interaction with the added refractory oxide, it will be apparent that sufficient sodium should be initially present at the second exchange step to permit a substantial portion of the ion exchange capacity to become satisfied by ammonium ions. Accordingly the zeolite subjected to the second ion exchange step should contain sufficiently sodium remaining from the first exchange step, to provide in the double-exchanged zeolite an amount of ammonium ion corresponding to at least about 5 relative percent, preferably 10–20 percent, of the original ion exchange capacity of the zeolite.

Prior to the final calcination step, preferably following the second exchange step, the zeolite component is intimately admixed with a finely divided, hydrous, refractory oxide of a difficultly reducible metal. The term "hydrous" is used to designate oxides having structural surface hydroxyl groups detectable by infra red analysis. The preferred oxides are alumina, silica, magnesia, beryllia, zirconia, titania, thoria, chromia, and combinations thereof such as silica-alumina, silica-magnesia, and the like. Naturally occurring clays comprising silica and alumina may also be utilized, preferably after acid treatment. The resulting mixtures may contain between about 0.5 and 98 weight-percent of zeolite, preferably at least about 2 weight-percent, and generally about 2 to about 80 weight-percent, based on the combined dry weight of the zeolite and the metal oxide. The metal oxide can be combined with the zeolite as a hydrous sol or gel, as an anhydrous activated gel, a spray dried powder or a calcined powder. In one modification a sol or solution of the metal oxide precursor such as an alkali metal silicate or aluminate can be precepitated to form a gel in the presence of the zeolite.

When less hydrous forms of the metal oxide are combined with the zeolite, essentially any method of effecting intimate admixture of the components may be utilized. One such method is mechanical admixture, e.g., mulling, which involves admixing the zeolite in the form of a powder with the slightly hydrous, finely divided form of the metal oxide. Minor amounts of water, with or without an acidic peptizing agent such as a strong mineral acid, are usually added to facilitate admixture.

After admixing the hydrous oxide with the zeolite component, it is normally preferable at this point to form the mixture into the shape desired for the final catalyst. Conventional tableting, prilling, or extruding procedures may be utilized to produce tablets, prills or extrudate pellets having a diameter of about 1/32 inch to 3/8 inch. Other conventional pelleting aids may be added such as lubricants, binders, diluents, etc.

The pelleted zeolite-metal oxide composition is then subjected to a second calcining at temperatures between about 600° and 1800° F., preferably about 750°–1200° F. It is preferred to caintain a relatively anhydrous environment during this second calcination. If there is a substantial water vapor partial pressure during this step, the final catalyst is usually less active than those produced in the substantial absence of water vapor. Accordingly, this calcination is preferably conducted in the presence of less than 2, and preferably less than about 1, p.s.i. of water vapor. The calcination may be regarded as complete when substantially all water and ammonia have been expelled from the catalyst, which, depending on the temperature employed, may range between about 10 minutes and 12 hours or more.

The necessary metal hydrogenation component may be distributed selectively on the zeolite component of the catalyst, or on the metal oxide component. Alternatively it may be distributed more or less equally on both components. Effective hydrogenation components comprise the Group VI–B and/or Group VIII metals and their oxides and/or sulfides, with or without other metals such as rhenium. Operative proportions (based on free metal) may range between about 0.1 percent and 30 percent by weight, depending upon the type of metal or metals selected, and the desired activity. In the case of the Group VIII noble metals, amounts in the range of 0.1 to about 2 percent will normally be employed; the iron group metals, iron, cobalt and nickel, are normally utilized in proportions of about 1–10 weight-percent; the Group VI–B metals will normally be utilized in proportions of about 3–20 weight-percent. Preferred hydrogenating metals are palladium, platinum, nickel, cobalt, tungsten and molybdenum. Particularly preferred are palladium, or combinations of nickel and/or cobalt with molybdenum and/or tungsten.

The hydrogenating component may be added to the catalyst at any desired stage in its manufacture. Preferred methods include impregnation and/or ion-exchange of soluble metal salts into the powdered zeolite after the second ammonium ion exchange, or into the catalyst pellets prior to the final calcination step. Other methods include mixing of soluble or insoluble compounds of the desired metal or metals with the powdered zeolite-hydrous metal oxide mixture prior to extruding or pelleting.

Feedstocks which may be directly subjected to hydrocracking herein include in general any mineral oil fraction boiling between about 200° and 1400° F., preferably 350–1200° F., and containing less than about 10 p.p.m., preferably less than about 5 p.p.m. of organic nitrogen. This includes straight run gas oils, coker distillate gas oils, deasphalted crude oils, cycle oils derived from catalytic or thermal cracking operations, and the like, any of which may if necessary have been subjected to suitable pretreatment to reduce the organic nitrogen content to the specified levels. The hydrocracking may be carried out in the presence of between about 5 and 5,000 p.p.m., preferably about 50–2,000 p.p.m. by weight of ammonia. Suitable hydrocracking conditions may be selected within the following ranges:

HYDROCRACKING CONDITIONS

|  | Broad range | Preferred range |
| --- | --- | --- |
| Temperature, °F | 600–850 | 650–800 |
| Pressure, p.s.i.g | 500–3,000 | 600–2,000 |
| LHSV | 0.2–10 | 1–5 |
| H²/oil ratio, m.s.c.f./bbl | 0.5–15 | 1–10 |

In cases where the initial feedstock contains more than about 10 p.p.m. of organic nitrogen, the preferred integral hydrofining-hydrocracking system is utilized. In this procedure, the feedstock is first subjected to a conventional catalytic hydrofining treatment, and the effluent therefrom, without intervening treatment to remove ammonia, is directly subjected to the above described hydrocracking procedure. Suitable hydrofining conditions may be selected within the following ranges:

HYDROFINING CONDITIONS

|  | Broad range | Preferred range |
| --- | --- | --- |
| Temperature, °F | 600–850 | 650–800 |
| Pressure, p.s.i.g | 500–3,000 | 600–2,500 |
| LHSV | 0.2–20 | 1–5 |
| H²/oil ratio, m.s.c.f./bbl | 0.5–15 | 1–15 |

The hydrofining catalyst may comprise any of the oxides and/or sulfides of the transitional metals, and especially an oxide or sulfide of a Group VIII metal (particularly cobalt or nickel) mixed with an oxide or sulfide of a Group VI–B metal (preferably molybdenum or tungsten). A preferred composition comprises the sulfided equivalent of about 3–8 weight-percent NiO and 8–25 weight-percent of MoO₃ supported on an activated alumina carrier. Other suitable carriers include silica, zirconia, titania, clays, zeolites and the like.

The following examples are cited to demonstrate the superior ammonia stability of the catalyst of this invention, but are not to be construed as limiting in scope:

EXAMPLE I

A palladium-zeolite-alumina catalyst of this invention was prepared as follows: Sodium Y zeolite having a SiO₂/Al₂O₃ mole-ratio of about 4.8 was repeatedly ion exchanged with excess ammonium sulfate solution until the sodium content thereof was reduced to 1.7 weight-percent Na₂O. The zeolite was then recovered by filtration and activated by steaming at 700° C. for one hour in contact with about 15 p.s.i. of water vapor. Re-exchange with ammonium sulfate further reduced the sodium content to 0.2 weight-percent Na₂O. This material was then subjected to ion exchange with an aqueous ammoniacal solution of palladium tetramminochloride,

in proportions sufficient to introduce 0.65 weight-percent palladium metal into the zeolite (corresponding to 0.5 weight-percent palladium in the final composition).

An extrudable paste was then prepared by mixing sufficient proportions of the zeolite, alumina and water to provide a finished product containing 80 weight-percent zeolite and 20 weight-percent alumina on a dry weight basis. The paste was then extruded and calcined in air by gradually increasing the temperature of the extrudate to 930° F. over a five hour period, and holding at that temperature for an additional one hour. Throughout the final calcining, dry air containing less than 0.5 p.s.i. water vapor was passed over the zeolite supported on a porous grid in the calcination furnace.

EXAMPLE II

A zeolite characterized as "ultrastable" was prepared in accordance with procedure "A" disclosed by McDaniel and Maher in their publication "New Ultrastable Form of Faujasite," published by the Society Chemical Industry, London, 1968, as one of the papers read at the conference held at the School of Pharmacy (University of London) on Apr. 4–6, 1967. By this procedure, a sodium Y zeolite is first exchanged with ammonium ion by contacting with an aqueous solution of ammonium sulfate while agitating at 212° F. for fifteen minutes. The solids are recovered by filtration and exchanged one additional time to reduce the sodium content to about 3 weight-percent Na₂O. This material is then water washed and calcined at 1004° F. for three hours. The calcined zeolite is then re-exchanged with ammonium ion by contacting with ammonium sulfate solution as described above for two additional exchanges of one and two hours, respectively. The exchanged zeolite is then recovered by filtration and calcined at 1562° F. for three hours.

EXAMPLE III

The structural stability of the compositions of Examples I and II to ammonia gas was evaluated by the following procedure: The finally calcined zeolites were rehydrated in water-saturated air at about 70° F. for sixteen hours. The hydrated zeolites were then suspended in a packed column and ammonia gas was passed upwardly through the respective beds for a period of about 2½ hours. Contacting time was determined by detecting the breakthrough of ammonia gas through the top of the zeolite beds, and continuing the introduction of ammonia gas into the beds for two additional hours. The zeolites were then purged with dry nitrogen gas at about 70° F. for sixteen hours to remove excess ammonia. The resultant materials were then calcined in flowing dry air as described in Example I.

The composition of Example I had an original crystallinity as determined by X-ray diffraction with copper K-alpha radiation of 61 percent compared to a lab standard. The surface area of this material was 715 square meters per gram as determined by nitrogen adsorption.

After the ammonia stability test the crystallinity had been reduced by 4 relative points to a value of 57. The surface area had been reduced only slightly to 696 square meters per gram.

By comparison the original crystallinity of the "ultrastable" zeolite composition of Example II was 85 percent. Following the ammonia stability test the crystallinity had been reduced to 25 percent corresponding to a relative crystallinity reduction of 71 percent.

EXAMPLE IV

Another composition of this invention was prepared in accordance with the procedures described in Example I. This material had an original crystallinity of 55 percent and an original surface area of 683 square meters per gram and contained 0.5 weight-percent palladium determined as the metal. The ammonia stability of this material was determined by the procedure described in Example III. The product exhibited a crystallinity of 45 relative percent, corresponding to a relative crystallinity reduction of about 18 percent. The surface area of the product was 663 square meters per gram representing a relative surface area reduction of only 2.9 percent.

EXAMPLE V

A portion of the "ultrastable" zeolite prepared in accordance with the procedure described in Example II was contacted with a solution of tetraamine palladium chloride in proportion sufficient to incorporate into the zeolite approximately 0.65 weight-percent palladium determined as the metal. This material was then combined with sufficient alumina and water to form an extrudable paste having a dry weight composition corresponding to 80 weight-percent zeolite and 20 weight-percent alumina. The pellets resulting from the extrusion of this paste were then calcined at 920° F. for one hour.

The resulting composition containing 0.5 weight-percent palladium on a total weight basis exhibited an original crystallinity of 46 relative percent. This material was then subjected to the ammonia stability test described in Example III. As a result of that procedure the crystallinity of the total composition had been reduced to a level of only 12 percent corresponding to a reduction of about 74 relative percent. The results of Examples I through V are summarized in the following table.

| Experiment No. | Original | | Final | | Relative crystallinity loss [2] |
|---|---|---|---|---|---|
| | Crystallinity [1] | Surface area, m.²/g. | Crystallinity [1] | Surface area, m.²/g. | |
| I | 61 | 715 | 57 | 696 | 6.6 |
| II | 85 | | 25 | | 71 |
| IV | 55 | 683 | 45 | 663 | 18 |
| V | 46 | | 12 | | 74 |

[1] Relative crystallinity.
[2] Original crystallinity minus final crystallinity divided by original crystallinity.

As shown by these results, the relative crystallinity of the products of this invention exemplified by Examples I and IV was reduced only by 6.6 and 18 percent respectively. In contrast the crystallinity of the "ultrastable" zeolite compositions of Examples II and V was reduced by 71 and 74 percent respectively upon being subjected to ammonia.

EXAMPLE VI

The superior activity of catalysts based on the AS-US zeolite of this invention, as compared to ultrastable zeolite, is believed attributable at least in part to the higher residual ion exchange capacity remaining in the finally calcined AS-US zeolite. This example and Example VII demonstrate the difference in the respective residual ion exchange capacities.

A stabilized zeolite-alumina combination of this invention was prepared as follows:

A sodium Y zeolite was repeatedly exchanged with ammonium sulfate until the sodium level had been reduced to 2.7 percent sodium metal. The residual ion exchange capacity of this material was equivaluent to 9.4 weight-percent sodium. This determination was made by repeatedly exchanging the ammonium zeolite with 10 percent sodium nitrate solution for two hours, repeated twice and determining the amount of sodium reexchanged into the zeolite.

The ammonium zeolite was then calcined in the presence of steam as described in Example I for one hour at 800° C. The steamed material contained 2.6 percent sodium and exhibited an exchange capacity of 3.47 percent sodium. The steamed zeolite was then exchanged with ammonium ion by repeatedly contacting with ammonium sulfate solution until the sodium content had been reduced to 0.25 percent. The ion exchange capacity of this material was equivalent to 3.4 percent sodium ion determined as above.

The steamed hydrogen-ammonium zeolite was then combined with sufficient alumina and water to form an extrudable paste containing 50 weight-percent alumina and 50 weight-percent zeolite on a dry weight basis. The paste was then extruded, dried and calcined at 900° F. for one hour in dry flowing air. The calcined extrudates were then subjected to the above described ion exchange test. The final composition, illustrative of the compositions of this invention, possessed an ion exchange capacity equivalent to 0.79 weight-percent sodium ion.

EXAMPLE VII

The residual ion exchange capacity of an "ultrastable" zeolite prepared in accordance with the procedure described in U.S. Pat. 3,293,192 was determined as follows: The hydrogen-ammonium zeolite prepared in Example VI, prior to combination with the alumina, was calcined at 800° C. for one hour by rapid heating in a closed dish.

The resultant material contained 0.25 weight-percent sodium and exhibited an exchange capacity of 1.4 weight-percent sodium upon exchange with sodium nitrate.

The calcined zeolite was then combined with sufficient alumina and water to form an extrudable paste containing 50 weight-percent alumina and 50 weight-percent zeolite on a dry weight basis. This material was then extruded and calcined as described in Example VI. The resulting extrudates were then subjected to the above-described ion exchange test and were determined to exhibit an ion exchange capacity of 0.25 weight-percent sodium ion. This exchange capacity is less than one-third that exhibited by the combination of this invention described in Example VI.

EXAMPLE VIII

This example illustrates suitable conditions and results obtainable in a hydrocracking run using the integral hydrofining-hydrocracking technique described above. The feedstock is a blend of catalytic cracking cycle oil and straight run and coker distillate gas oils, the principal characteristics of which are as follows:

Boiling range, ° F. _____ 400–850
Gravity, ° API _____ 22
Sulfur content, wt-percent _____ 1.1
Nitrogen content, wt-percent _____ 0.18
Wt-percent aromatics _____ 40

The feed is passed first over a hydrofining catalyst consisting of the sulfided equivalent of 30 percent nickel oxide and 18.0 percent molybdenum oxide supported on an alumina carrier. Beginning-of-run hydrofining conditions are as follows:

Temperature (average bed), °F. _____ 735
Pressure, p.s.i.g. _____ 1500
LHSV _____ 1.25
$H_2$/oil ratio, m.s.c.f./b. _____ 10

Under these conditions, total organic nitrogen content of the resulting hydrofined oil is about 1–3 p.p.m. The total hydrofining effluent is then passed continuously into a hydrocracking zone containing the ammonia-stable Pd-zeolite-alumina catalyst described in Example I. Beginning-of-run hydrocracking conditions are as follows:

Temperature, °F. (average bed) _____ 710
Pressure, p.s.i.g. _____ 1500
LHSV _____ 1.7
$H_2$/oil ratio, m.s.c.f./b. _____ 10

Under these conditions the conversion per pass to $C_4$–400° F. end point gasoline is about 40 volume percent of fresh feed. This conversion level can be maintained for a total run length of at least about six months, normally at least about 12 months, by periodically raising temperatures in the respective reactors an average of about 0.01° to 1° F. per day to compensate for catalyst deactivation. Periodic contamination of the feed with water does not materially affect the operation whereas, if a corresponding hydrocracking catalyst based on ultrastable zeolite is employed, a substantial drop in hydrocracking activity follows when water vapor is introduced into the hydrocracking reactor.

It is not intended that the invention should be limited to the details described above. The following claims and obvious equivalents thereof are intended to define the true scope of the invention.

I claim:

1. A process for hydrocracking a hydrocarbon feedstock containing less than about 10 p.p.m. of organic nitrogen which comprises contacting said feedstock along with at least about 5 p.p.m. of ammonia and added hydrogen with a hydrocracking catalyst under hydrocracking conditions, said catalyst comprising a Group VIII metal hydrogenating component supported on a metal-cation-deficient Y zeolite cracking base, said cracking base having been prepared by: (1) subjecting a sodium Y zeolite to a first ammonium ion exchange treatment to reduce the sodium content thereof to between about 0.5 percent and 5 percent $Na_2O$ by weight; (2) calcining the exchanged zeolite in the presence of steam to produce a sodium-hydrogen Y zeolite, (3) re-exchanging the calcined zeolite with ammonium ions to further reduce the sodium content thereof to less than about 2 percent $Na_2O$, and (4) calcining the re-exchanged ammonium-hydrogen zeolite in intimate admixture with a finely divided, hydrous inorganic oxide to effect deammoniation of the mixture, said inorganic oxide being selected from the class consisting of alumina, silica, magnesia, titania, zirconia, thoria, beryllia, chromia, clays, and mixtures thereof.

2. A process as defined in claim 1 wherein said inorganic oxide is admixed with said ammonium-hydrogen zeolite between steps (3) and (4).

3. A process as defined in claim 1 wherein said inorganic oxide is essentially alumina.

4. A process as defined in claim 1 wherein said inorganic oxide is a silica-magnesia cogel.

5. A process as defined in claim 1 wherein said inorganic oxide is a silica-alumina cogel.

6. A process as defined in claim 1 wherein said Group VIII metal is palladium and said inorganic oxide is essentially alumina.

7. A process as defined in claim 1 wherein said Group VIII metal is nickel and/or cobalt, said inorganic oxide is essentially alumina, and wherein the catalyst also comprises a Group VIB metal, or an oxide or sulfide thereof.

8. A process as defined in claim 1 wherein the weight ratio of said Y zeolite cracking base to said inorganic oxide is between about 0.5/99.5 and 98/2.

9. A process for hydrofining and hydrocracking a hydrocarbon feedstock containing at least about 5 p.p.m. of organic nitrogen, which comprises:
   (1) subjecting said feedstock plus added hydrogen to catalytic hydrofining to convert at least the major portion of said organic nitrogen to ammonia and produce a product effluent containing less than about 10 p.p.m. of organic nitrogen; and
   (2) subjecting total effluent from step (1), without intervening separation of ammonia, to catalytic hydrocracking in contact with a catalyst comprising a Group VIII metal hydrogenating component supported on a metal-cation-deficient Y zeolite cracking base, said cracking base having been prepared by:
   (a) subjecting a sodium Y zeolite to a first ammonium ion exchange treatment to reduce the sodium content thereof to between about 1–4 percent $Na_2O$ by weight,
   (b) calcining the exchanged zeolite in the presence of steam to produce a sodium-hydrogen Y zeolite,
   (c) re-exchanging the calcined zeolite with ammonium ions to further reduce the sodium content thereof to less than about 1% $Na_2O$, and
   (d) calcining the re-exchanged ammonium-hydrogen zeolite in intimate admixture with a finely divided, hydrous inorganic oxide to effect deammoniation of the mixture, said inorganic oxide being selected from the class consisting of alumina, silica, magnesia, titania, zirconia, thoria, beryllia, chromia, clays, and mixtures thereof.

10. A process as defined in claim 9 wherein said inorganic oxide is admixed with said ammonium-hydrogen zeolite between steps (c) and (d).

11. A process as defined in claim 9 wherein said inorganic oxide is essentially alumina.

12. A process as defined in claim 9 wherein said inorganic oxide is a silica-magnesia cogel.

13. A process as defined in claim 9 wherein said inorganic oxide is a silica-alumina cogel.

14. A process as defined in claim 9 wherein said Group VIII metal is palladium and said inorganic oxide is essentially alumina.

15. A process as defined in claim 9 wherein said Group VIII metal is nickel and/or cobalt, said inorganic oxide is essentially alumina, and wherein the catalyst also comprises a Group VI-B metal, or an oxide or sulfide thereof.

16. A process as defined in claim 9 wherein the weight ratio of said Y zeolite cracking base to said inorganic oxide is between about 0.5/99.5 and 98/2.

References Cited
UNITED STATES PATENTS

| | | | |
|---|---|---|---|
| 3,518,051 | 6/1970 | Maher et al. | 252—455 Z |
| 3,428,550 | 2/1969 | Erickson et al. | 252—455 Z |
| 3,617,483 | 11/1971 | Child et al. | 208—89 |
| 3,293,192 | 12/1966 | Maher et al. | 252—430 |

DELBERT E. GANTZ, Primary Examiner

J. W. HELLWEGE, Assistant Examiner

U.S. Cl. X.R.

208—111, DIG. 2; 252—455 Z